United States Patent
Iwamoto (10) Patent No.: US 6,577,563 B1
(45) Date of Patent: Jun. 10, 2003

(54) DISK APPARATUS

(75) Inventor: Atsushi Iwamoto, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 442 days.

(21) Appl. No.: 09/692,057

(22) Filed: Oct. 20, 2000

(30) Foreign Application Priority Data

Oct. 22, 1999 (JP) ............................................. 11-300788

(51) Int. Cl.[7] .............................................. G11B 21/08
(52) U.S. Cl. .................................. 369/32.01; 369/30.23
(58) Field of Search ........................... 369/32.01, 47.29, 369/47.32, 124.07, 275.3, 47.49, 53.35, 30.15, 30.1, 116, 275.2, 30.23, 47.13, 47.33, 47.34, 30.09, 47.23, 30.05

(56) References Cited

U.S. PATENT DOCUMENTS 5,799,212 A * 8/1998 Ohmori .................... 710/73
5,802,026 A * 9/1998 Tsukihashi ............... 369/47.24
5,818,799 A * 10/1998 Kondo et al. ............. 369/30.05

FOREIGN PATENT DOCUMENTS

JP 57-125439 8/1982
JP 2853639 11/1998

* cited by examiner

Primary Examiner—Ali Neyzari
(74) Attorney, Agent, or Firm—Morgan, Lewis & Bockius LLP (57) ABSTRACT

When overwrite inhibiting is directed, flags (oblique lines in FIG. 4) for indicating the overwrite inhibiting are set in all the sectors between a sector 51 in which the overwrite inhibiting is directed in a buffer area and a certain preceding sector 52 and also, decoding is continued from the next sector 53 of the overwrite inhibiting area. At this time, when buffering is completed to the one preceding sector 50 of the overwrite inhibiting area, the buffering jumps the overwrite inhibiting area and is continued from the next sector 53 of the overwrite inhibiting area. Also, in decoding, when a special reproducing mode is directed, a decoding position (a position of a sector 54) at that point in time is stored as the present position and thereafter, the decoding of the overwrite inhibiting area is performed.

6 Claims, 5 Drawing Sheets

DISK APPARATUS

BACKGROUND OF THE INVENTION

The present invention relates to a disk apparatus such as a mini disk (MD), a compact disk (CD) or a digital video disk (DVD) for converting an analog signal such as an audio signal into a digital signal to perform recording and reproducing to a disk-shaped record medium (disk).

Recently, MD players for converting an analog signal of audio into a digital signal to record it in a magneto-optical disk have rapidly become prevalent as a recording and reproducing apparatus of an audio signal substitute for analog cassette players.

Figure 1:
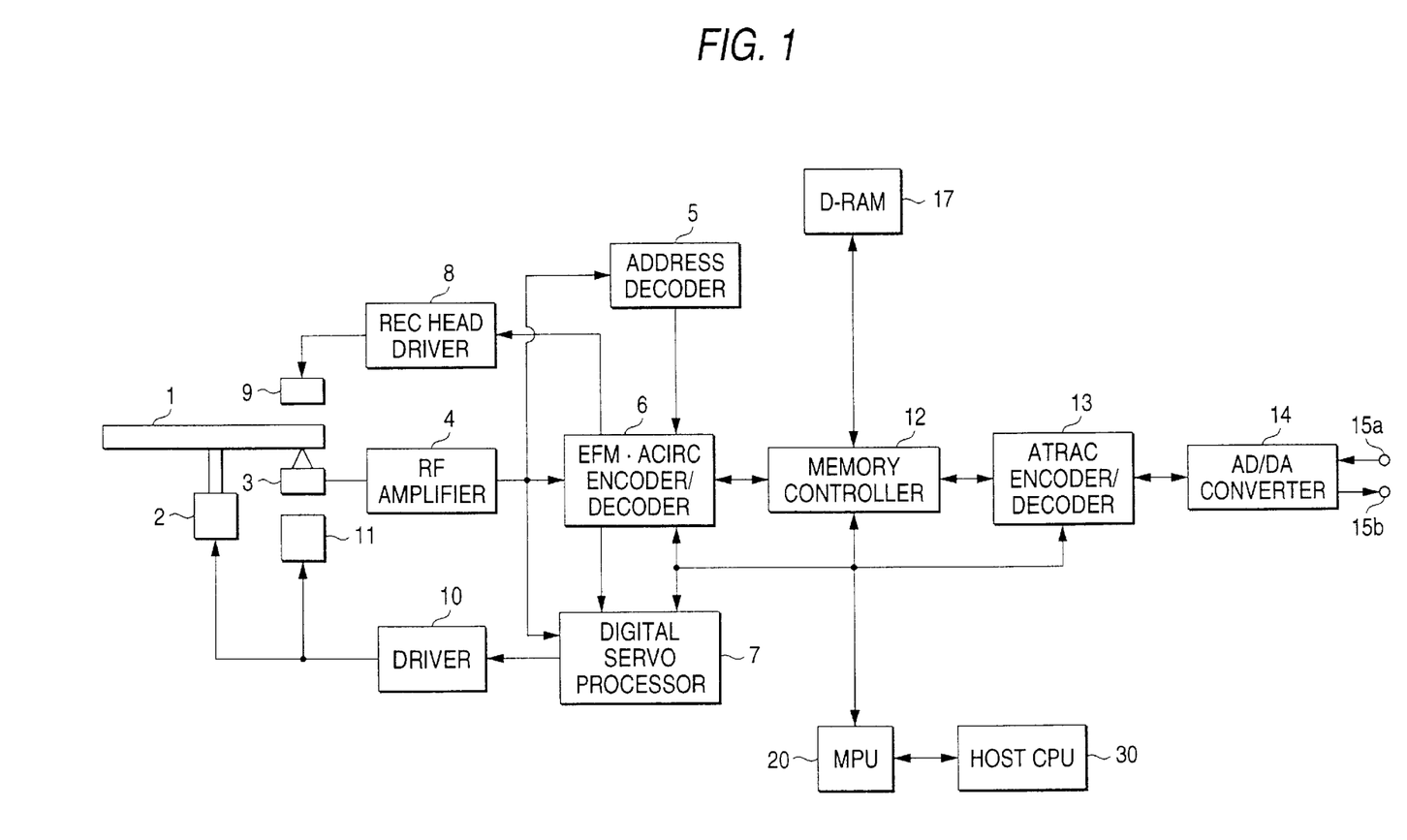
FIG. 1 is a block diagram showing a system configuration of an MD player of a disk apparatus of the invention.

FIG. 1 is a block diagram showing a basic circuit configuration of such MD players.

An output of an optical pickup 3 for detecting information from a magneto-optical disk (hereinafter called "mini disk") 1 rotated and driven by a spindle motor 2 is introduced to an address decoder 5, an EFM.ACIRC encoder/decoder 6 and a digital servo processor 7 through an RF amplifier 4, and an output of the address decoder 5 is introduced to the EFM.ACIRC encoder/decoder 6. Also, an output of the EFM.ACIRC encoder/decoder 6 is introduced to a magnetic head 9 for recording through a REC head driver 8. The EFM.ACIRC encoder/decoder 6 performs processing for separating signals of 16 bits with 8 bits to convert the 8 bits into 14 bits according to an error-correcting system by EFM modulation or ACIRC.

Also, the output of the EFM.ACIRC encoder/decoder 6 is introduced to the digital servo processor 7, and an output of the digital servo processor 7 is introduced to the spindle motor 2 and a thread motor 11 through a driver 10. The thread motor 11 is a motor for moving the whole of the optical pickup 3 or the magnetic head 9 for recording in a radial direction of the mini disk 1.

Also, the EFM.ACIRC encoder/decoder 6 is bidirectionally connected to a memory controller 12, and the memory controller 12 is bidirectionally connected to an ATRAC encoder/decoder 13, and the ATRAC encoder/decoder 13 is bidirectionally connected to an AD/DA converter 14 having an input terminal 15a and an output terminal 15b of analog audio.

Memory (D-RAM) 17 acting as a data buffer for preventing dropouts due to vibrations is connected to the memory controller 12. The memory controller 12 performs processing for once storing digital signals reproduced from the mini disk 1 in the D-RAM 17 and then sequentially taking out the digital signals and outputting them to the ATRAC encoder/decoder 13. Also, the ATRAC encoder/decoder 13 performs data compression or expanding of the compressed data by high efficient encoding processing referred to as ATRAC.

Each of these EFM-ACIRC encoder/decoder 6, digital servo processor 7, memory controller 12 and ATRAC encoder/decoder 13 is bidirectionally connected to an MPU 20 for performing operational control of the entire apparatus, and the MPU 20 has a configuration bidirectionally connected to a host CPU 30 which is a key controller. The MPU 20 receives various commands sent from the host CPU 30 and executes each processing according to the received commands.

Incidentally, a sampling rate converter which is connected to the ATRAC encoder/decoder 13 and directly performs digital signals or input and output terminals of the digital signals are omitted in FIG. 1.

Figure 2:
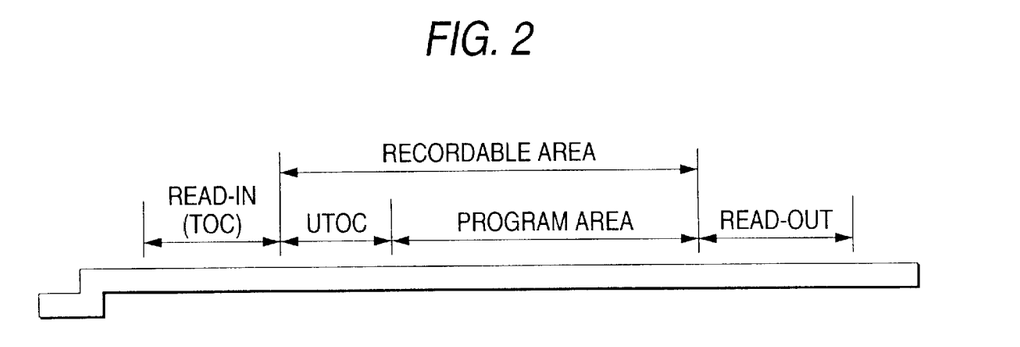
FIG. 2 is an illustration showing a data record layout of a recordable mini disk.

FIG. 2 shows a data record layout of the mini disk 1. In a recordable MD, a Lead-in area including TOC, a UTOC area, a program area (digital signal recording area), and a Lead-out area are formed from the inner circumferential side toward the outer circumferential side of the disk, and the UTOC area and the program area are set as a recordable area. A laser power necessary in recording, a recordable area, and an address of UTOC are recorded in the TOC area. Also, part information of tracks (music) is recorded in the UTOC area, and each of the part information comprises a starting address and an ending address of the part, a track mode, and a link pointer. The link pointer indicates the starting address of the continuous part. For example, when one track (music) is divided into a part 1, a part 3 and a part 5, and is recorded in this order, a link pointer included in part information of the part 1 indicates a starting address of the part 3, and a link pointer included in part information of the part 3 indicates a starting address of the part 5.

Next, reproducing operations in the MD player constructed as shown above will be described.

When reproduction is started, the MPU 20 controls the digital servo processor 7 to control rotation of the mini disk 1 and movement of the optical pickup 3, and reads TOC information and UTOC information (index information) from the mini disk 1, and preserves this read UTOC information in the D-RAM 17 via the RF amplifier 4, the EFM.ACIRC encoder/decoder 6 and the memory controller 12.

Then, in order to acquire reproducing track information, the MPU 20 controls the memory controller 12 to acquire track pointer information of the UTOC, and acquires part information (hereinafter also called "part descriptor") of the UTOC corresponding to the acquired track pointer.

Here, when the track to be reproduced is divided into the part 1, the part 3 and the part 5 as described above, the MPU 20 acquires contents of a part descriptor corresponding to the first part 1 via the memory controller 12 and starts reproduction according to the acquired contents (a starting address, an ending address, a track mode and a link pointer). That is, the MPU 20 controls the digital servo processor 7 to move the optical pickup 3 to a target address (a starting address) and controls the EFM.ACIRC encoder/decoder to start the reproduction. The reproduced digital signal is amplified by the RF amplifier 4 and decoding processing such as EFM demodulation or error correction processing is performed by the EFM.ACIRC encoder/decoder 6 and then, the signal is once stored in the D-RAM 17 via the memory controller 12 and is again read at proper timing, and expanding of compression data is performed by the ATRAC encoder/decoder 13 and thereafter, the data is converted into an analog signal by the AD/DA converter 14 and is outputted from the analog audio output terminal 15b.

In this manner, when the reproduction of the part 1 nears the end, the MPU 20 acquires part information to be next reproduced from information of the link pointer included in part information of the part 1 (the link pointer in this case indicates a starting address of the part 3), and acquires contents of a part descriptor corresponding to the next part 3 from the D-RAM 17 via the memory controller 12. Then, reproduction is continued according to the acquired contents (a starting address, an ending address, a track mode and a link pointer). In like manner, when the reproduction of the part 3 nears the end, the MPU 20 acquires part information to be next reproduced from information of the link pointer included in part information of the part 3 (the link pointer in this case indicates a starting address of the part 5), and acquires contents of a part descriptor corresponding to the next part 5 from the D-RAM 17 via the memory controller 12. Then, reproduction is continued according to the acquired contents (a starting address, an ending address, a track mode and a link pointer). Subsequently, when reproduction is performed to the ending address included in the part information of the part 5, the reproduction of the track (music) is completed.

In the conventional MD player thus, when operating the reproduction, it is constructed so that the MPU 20 acquires the part information in the UTOC information stored in the D-RAM 17 via the memory controller 12 and controls reproduction operations according to the acquired part information. Also, it is constructed so that the memory controller 12 reproduces the digital signal while continuously repeating the processing for sequentially buffering the digital signal read from the mini disk 1 in the D-RAM 17 and also sequentially decoding the buffered area at proper timing.

Such a buffering method using a storage medium such as the D-RAM 17 is conventionally performed and is disclosed in, for example, the Unexamined Japanese Patent Application Nos. Sho57-125439 or Hei9-222958 (JP-Patent No. 2853639).

By the way, in such a buffering method, as described above, the digital signal is reproduced while continuously repeating the processing for sequentially buffering the digital signal read from the mini disk 1 in the D-RAM 17 and also sequentially decoding the buffered area at proper timing. That is, a buffer area after decoding is constructed so as to be overwritten at the next buffering. As a result of that, even when it is considered that a user again wishes to reproduce the contents reproduced shortly previously, the contents does not already remain in the D-RAM 17, so that there was a problem that a reading must be again made from the mini disk 1 to perform reproduction.

Also, there is conventionally a function of A-B repeat, and this function is a function for preserving only an address of an A point and an address of a B point to perform repeat reproduction of an interval between the preserved addresses. As a result of that, for example, when a difference in phrases of a start and an end of music wishes to be listened and compared, access to the beginning of the portion must be repeated and there was a problem that operations become troublesome. Further, since an interval address of the A point and the B point is held to perform buffering again, it takes some time before a seek is completed and a starting address is detected, so that there was a problem that the interval becomes a no sound section.

SUMMARY OF THE INVENTION

The invention is invented to solve such problems, and it is an object of the invention to provide a disk apparatus constructed so that data of an overwrite inhibiting area can be reproduced anytime with a simple operation by providing an area for inhibiting overwriting in a buffer area.

In order to solve the problems, a disk apparatus of the invention is characterized in that the disk apparatus has reproducing control means for reproducing a digital signal while continuously repeating processing for sequentially buffering the digital signal read from a disk in a storage medium and also sequentially decoding the buffered area at proper timing in a normal reproducing mode, and comprises directive means for directing overwrite inhibiting of the storage medium, and the reproducing control means sets a predetermined area in a buffer area of the storage medium to an overwrite inhibiting area when the overwrite inhibiting is directed by operating the directive means and executes the normal reproducing mode while jumping this overwrite inhibiting area. As a result of this, the overwrite inhibiting area is secured in the buffer area of the storage medium used for the buffering in reproducing the digital signal, so that data stored in this overwrite inhibiting area can be easily reproduced anytime.

Also, the disk apparatus of the invention is characterized in that in the configuration, when the overwrite inhibiting is directed by operating the directive means, the reproducing control means sets an area between the next section of a buffer section in which buffering is completed at that point in time and a predetermined section to an overwrite inhibiting area. In other words, a user operates the directive means only once and thereby, the beginning and end of the overwrite inhibiting area are automatically determined and a simple operation can be provided for the user.

Further, the disk apparatus of the invention is characterized in that in each of the configuration, directive means for directing a special reproducing mode for reproducing the overwrite inhibiting area of the storage medium is included and the reproducing control means reproduces the overwrite inhibiting area once or repeatedly reproduces the area two or more times when the special reproducing mode is directed by operating the directive means. In other words, the data of the overwrite inhibiting area can be instantly reproduced by a simple operation of only operating the directive means.

Furthermore, the disk apparatus of the invention is characterized in that in the configuration, the reproducing control means executes the normal reproducing mode again from the buffer section of the time before executing the special reproducing mode after the special reproducing mode is executed and the overwrite inhibiting area is reproduced once or repeatedly reproduced two or more times. As a result of this, switching between the normal reproducing mode and the special reproducing mode can be done smoothly.

Moreover, the disk apparatus of the invention is characterized in that in each of the configuration, the overwrite inhibiting area can be set to plural portions in the buffer area of the storage medium. As a result of this, access to the beginning of phrases of the plural portions can be easily obtained without waiting time.

In addition, the disk apparatus of the invention is characterized in that in each of the configuration, the disk is a mini disk and the storage medium is D-RAM and a buffer section of the storage medium is a sector unit (one sector=64 msec). As a result of this, for example, when contents of foreign languages such as English conversation are reproduced, a repeat of one sentence can be done, and a repeat of one bar can be done in reproduction of music.

DETAILED DESCRIPTION OF THE PREFERRED EMBODIMENTS

An embodiment of the invention will be described below with reference to the accompanying drawings.

Figure 3:
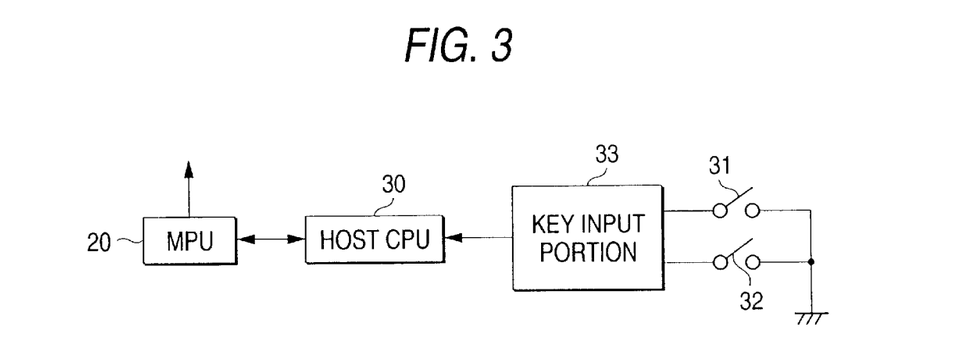
FIG. 3 is a block diagram showing a part of the system configuration of the MD player of the disk apparatus of the invention.

In the embodiment, the case of applying a disk apparatus of the invention to an MD player will be described. A system configuration of the MD player is made as shown in FIG. 1 described already and in the invention, an overwrite inhibiting mode is added to buffering processing of a D-RAM 17 in a normal reproducing mode executed in an MPU 20. Also, a function of executing a special reproducing mode described below is included in addition to the normal reproducing mode. For that purpose, in the embodiment, as shown in FIG. 3, an overwrite inhibiting key 31 for executing the overwrite inhibiting mode and a special reproducing key 32 for executing the special reproducing mode are connected to a host CPU 30 through a key input portion 33. These overwrite inhibiting key 31 and special reproducing key 32 are omitted in the drawing, and are provided on an operating panel of the MD player and are constructed so that settings and operations can freely be made by a user.

That is, the MPU 20 reproduces a digital signal while continuously repeating the processing for sequentially buffering the digital signal read from a mini disk 1 in the D-RAM 17 and also sequentially decoding the buffered area at proper timing in the normal reproducing mode. At this time, when overwrite inhibiting is directed by operating the overwrite inhibiting key 31, the MPU 20 sets a predetermined area in a buffer area of the D-RAM 17 to an overwrite inhibiting area. That is, at the time of directing the overwrite inhibiting, the area from the next section of a buffer section of the completion of buffering to a predetermined section is set to the overwrite inhibiting area. Then, this overwrite inhibiting area is skipped (jumped) and the normal reproducing mode is executed.

Also, when a special reproducing mode is directed by operating the special reproducing key 32 in the normal reproducing mode in which such an overwrite inhibiting area is jumped, the MPU 20 reproduces the overwrite inhibiting area once or repeatedly reproduces the area two or more times and executes the normal reproducing mode again from the buffer section of the time before executing the special reproducing mode. Incidentally, such an overwrite inhibiting area may be set to plural portions in the buffer area of the D-RAM 17.

FIGS. 4A to 4E are illustrations schematically showing the buffer area of the D-RAM 17, respectively, and states of buffering are shown by arrows of solid lines and states of decoding are shown by arrows of broken lines, respectively. In the D-RAM 17 used in the embodiment, sections of the buffer area are 212 sectors and one block (one section) indicates one sector.

First, buffering processing and decoding processing of the invention will be described with reference to FIGS. 4A to 4E.

Figure 4A:
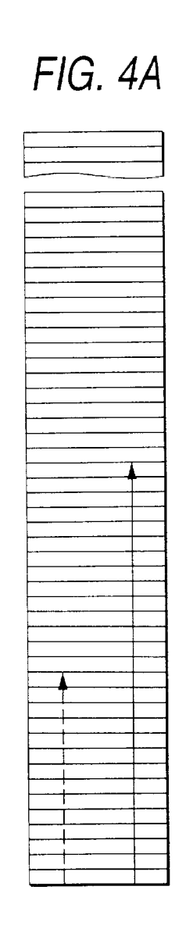
FIGS. 4A to 4E are illustrations schematically showing states of buffering and decoding in a buffer area.

In the normal reproducing mode, as shown in FIG. 4A, buffering first precedes and the buffered sectors are reproduced by decoding. In actual control, the decoding is started at the time when four sectors of buffering are completed. That is, the decoding is started with a delay of four sectors from the buffering.

Figure 4B:
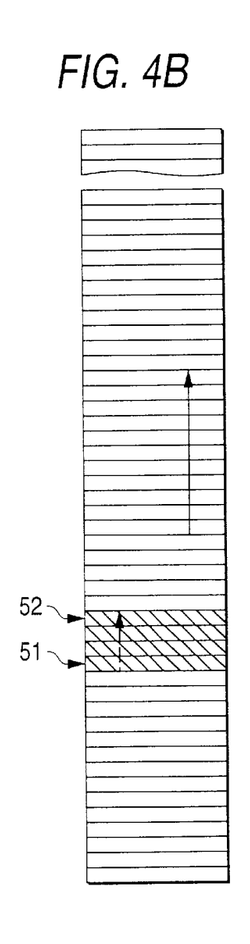

FIG. 4B shows the buffering processing when the overwrite inhibiting key 31 is operated in such a normal reproducing mode. That is, when overwrite inhibiting is directed, the MPU 20 keeps overwrite inhibiting marks from a sector (shown by numeral 51) in which the overwrite inhibiting is directed in the buffer area of the D-RAM 17 to a certain preceding sector (shown by numeral 52). Specifically, flags for indicating the overwrite inhibiting are set in all the sectors between the sector 51 in which the overwrite inhibiting is directed and the certain preceding sector 52. In FIG. 4B, oblique lines are drawn in the sectors in which the flags are set. Also at this time, the buffering continues. The decoding of the overwrite inhibiting area also continues in parallel with the setting of the flags. Incidentally, a range (a predetermined area) of the overwrite inhibiting area capable of directing by one operation of the overwrite inhibiting key 31 is up to one-half of all the buffer areas, namely within 106 sectors (about 6 to 7 seconds on a time basis). But, the range is set to four sectors in FIG. 4B. In case that the range is longer than 106 sectors, there is a possibility that dropouts occur under an influence on the normal reproducing mode.

Figure 4C:
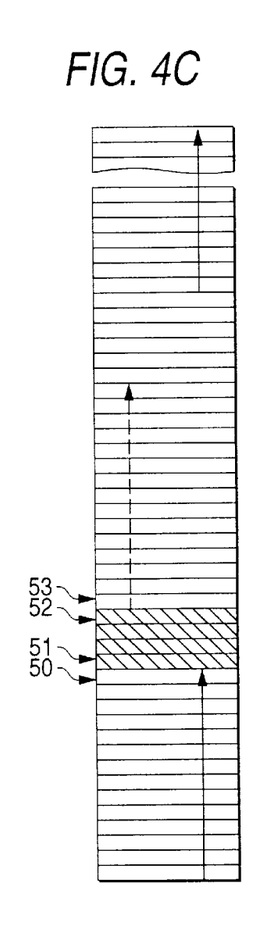

FIG. 4C shows a state of continuing decoding from the next sector (shown by numeral 53) of the overwrite inhibiting area after the setting of the flags in the overwrite inhibiting area are completed. In this case, when buffering returns to the beginning of the buffer area and is completed to the one preceding sector (shown by numeral 50) of the overwrite inhibiting area before the setting of the flags in the overwrite inhibiting area are completed, the buffering is once stopped at that point in time. This is because the buffering cannot be performed ahead of the decoding.

Figure 4D:
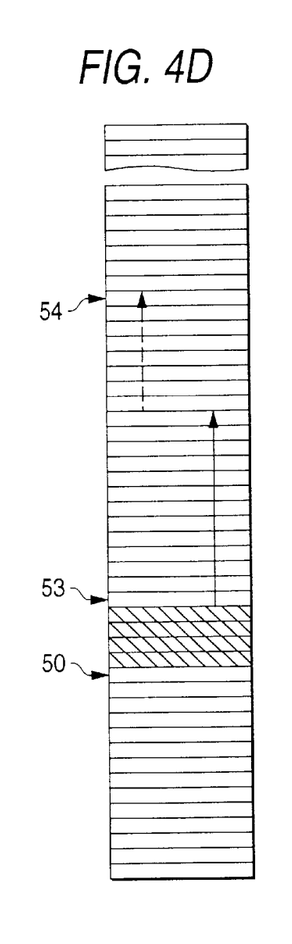

FIG. 4D shows a state of jumping the overwrite inhibiting area and continuing the buffering from the next sector 53 of the overwrite inhibiting area when the buffering is completed to the one preceding sector 50 of the overwrite inhibiting area.

Figure 4E:
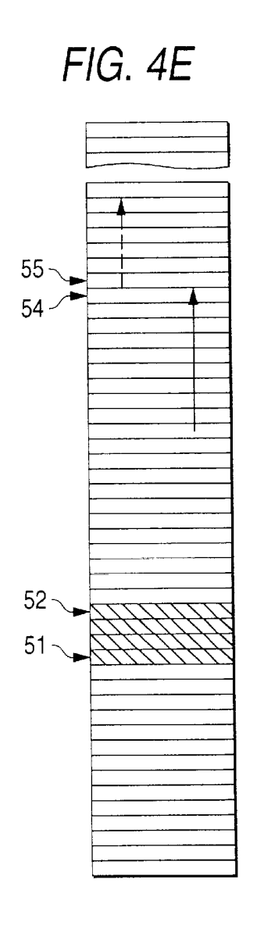

FIG. 4E shows a processing state of the special reproducing mode when the special reproducing key 32 is operated at the time of completing the decoding to a sector (shown by numeral 54) indicated in FIG. 4D. That is, when the special reproducing mode is directed, the MPU 20 stores a decoding position (namely, a position of the sector 54) at that point in time as the present position, and then sets a starting position of the decoding to the sector 51 of the beginning of the overwrite inhibiting area from the sector 54, and reproduces the overwrite inhibiting area once or repeatedly reproduces the area two or more times. Subsequently, when the reproduction of the overwrite inhibiting area is completed (to the sector 52), jumping is performed to the next sector 55 of the sector 54 stored as the present position and decoding by the normal reproducing mode is again continued. In this case, when the special reproducing mode is completed and buffering is completed to the sector 54 stored as the present position before the jumping is performed to the next sector 55 of the sector 54 stored as the present position, the buffering is once stopped at that point in time. In a manner similar to the case of FIG. 4C, this is because the buffering cannot be performed ahead of the decoding.

By such buffering processing and decoding processing shown in FIGS. 4A to 4E, even when the overwrite inhibiting area is provided in the buffer area of the D-RAM 17, the reproduction of the overwrite inhibiting area itself can be performed anytime by a simple operation while performing the buffering and the decoding in the normal reproducing mode without a hitch.

Next, buffering processing and decoding processing of the D-RAM 17 in the normal reproducing mode and the special reproducing mode in the MD player with the configuration will be described with reference to an operational flowchart of buffering processing shown in FIG. 5 and an operational flowchart of decoding processing shown in FIG. 6. Further, reference to FIGS. 4A to 4E will be also made as necessary.

In the normal reproducing mode, the MPU 20 acquires contents of a part descriptor corresponding to the first part of a track (music) to be reproduced via the memory controller 12 and starts reproduction according to the acquired contents (a starting address, an ending address, a track mode and a link pointer). That is, the MPU 20 controls the digital servo processor 7 to move the optical pickup 3 to a target address (a starting address) and starts the reproduction.

The reproduced digital signal is amplified by the RF amplifier 4 and decoding processing such as EFM demodulation or error correction processing is performed by the EFM.ACIRC encoder/decoder 6 and then, the signal is sequentially buffered in the buffer area of the D-RAM 17 in sector units via the memory controller 12. Also, in parallel with this, the digital signal is reproduced by sequentially decoding the buffered sector at proper timing, and expanding of compression data is performed by the ATRAC encoder/decoder 13 and thereafter, the data is converted into an analog signal by the AD/DA converter 14 and is outputted from the analog audio output terminal 15b.

Here, the buffering processing and the decoding processing are performed simultaneously in parallel as described using FIGS. 4A to 4E, but for convenience of description, the buffering processing and the decoding processing will be described individually.

(1) Buffering Processing

In buffering processing to the buffer area of the D-RAM 17, initialization processing for designating a starting position of a buffer is first performed (Step S1). Here, the first sector (the lowest sector shown in FIG. 4A) is set to a buffer starting position. Subsequently, it becomes a free wait state of the buffer, namely a free wait state of sectors capable of buffering (Step S2), and in this case, there is the state immediately after starting of the buffering and no data is present in each sector, so that it next becomes a seek completion wait state to a target address (Step S3). Then, after the seek completion, when a starting address is detected (Step S4), buffering is started in one sector unit (Step S5).

That is, when the buffering of one sector is completed (it is determined to satisfy Yes in Step S6), it is checked whether there is an ending address of a reproduction track at that time or not (Step S7) and if not (it is determined to satisfy No in Step S7), it is checked whether the next sector is a sector of an overwrite inhibiting area or not (Step S8). Subsequently, if not (it is determined to satisfy No in Step S8), it is checked whether overwrite inhibiting is then directed to the sector or not (Step S9) and if not, an operation proceeds to Step S5 and buffering of the sector is performed.

As a result of repeating the processing of such Steps S5 to S9, if it is determined that the overwrite inhibiting is directed in Step S9, an operation proceeds to Step S10 and the overwrite inhibiting area is set. That is, as shown in FIG. 4B, the overwrite inhibiting area is set by setting flags for indicating the overwrite inhibiting in all the sectors between the sector 51 in which the overwrite inhibiting is directed and the certain preceding sector 52.

Figure 5:
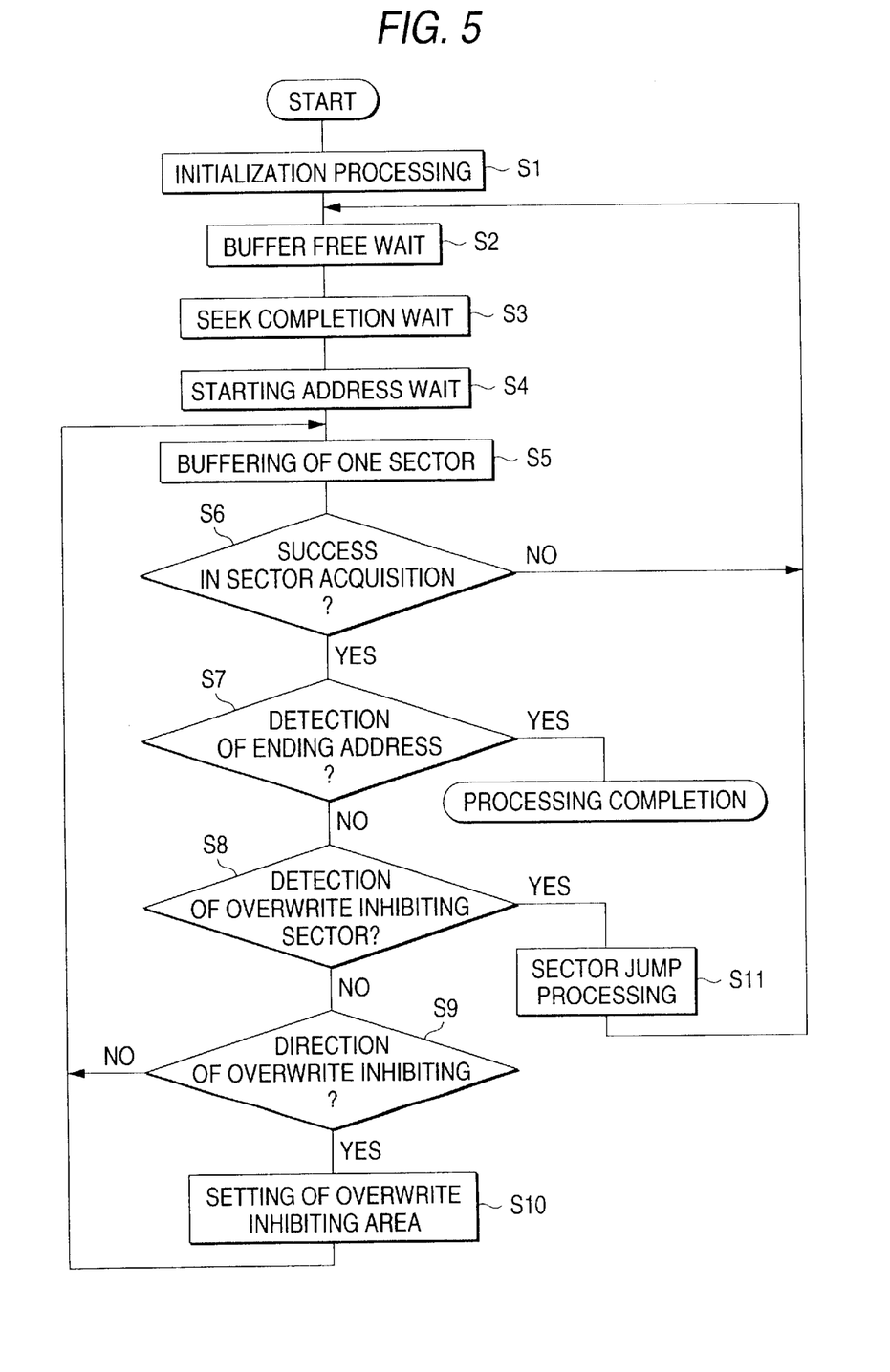
FIG. 5 is an operational flowchart of buffering processing in the disk apparatus of the invention.
Figure 6:
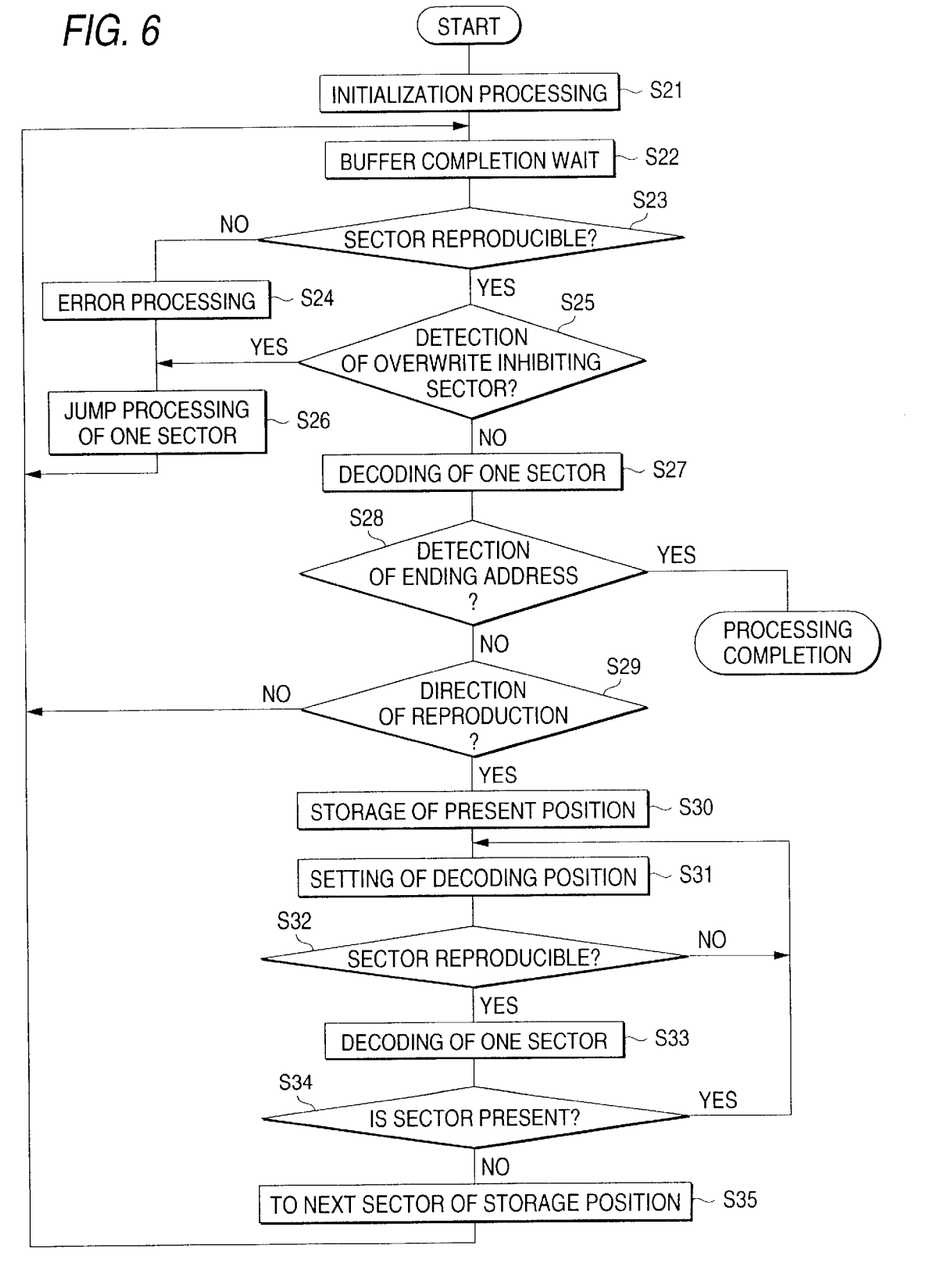
FIG. 6 is an operational flowchart of decoding processing in the disk apparatus of the invention.

Regarding FIG. 5, at this time, when there is no proper sector for buffering, Step S2 is performed to wait a vacant buffer. When there is a proper sector for buffering, jump process is performed to Step S5 so as to continue buffering.

Also, as a result of repeating the processing of such Steps S5 to S10, if it is determined that the next sector is a sector of the overwrite inhibiting area in Step S8 (if the flags are detected), an operation proceeds to Step S11 and one sector of jump processing is performed and then, an operation returns to Step S2 and processing is again repeated from the buffer free wait. The processing via such Step S11 is repeated until jumps of all the sectors (all the sectors between the sector 51 and the sector 52 in FIG. 4) set in the overwrite inhibiting area are completed.

Further, as a result of repeating the processing of such Steps S5 to S11, if it is determined that the ending address is detected in Step S7, the buffering of one track (namely, one music) is completed, so that the buffering operation is completed at this time.

(2) Decoding Processing

In decoding processing, initialization processing for designating a starting position of decoding is first performed (Step S21). Here, the first sector (the lowest sector shown in FIG. 4A) is set to a decoding starting position. Subsequently, after waiting completion of a buffer (Step S22), it is determined whether a sector for starting the decoding is reproducible or not (Step S23).

Here, the completion wait of the buffer in Step S22 means that immediately after buffering is started, four sectors of buffering is completed as described above and after buffering is started, buffering of the immediately following sector of the decoded sector is completed. Also, the determination whether the sector is reproducible or not in Step S23 is made because the buffered data may have broken. In Step S23, if it is determined that the data has broken, after error processing is performed in Step S24, jump processing of the sector is performed in the next Step S26 and an operation returns to Step S22.

On the contrary, if it is determined that the sector is reproducible in Step S23, an operation next proceeds to Step S25 and it is checked whether the sector is a sector of an overwrite inhibiting area or not. Subsequently, if so (it is determined to satisfy Yes in Step S25), an operation proceeds to Step S26 and one sector of jump processing is performed and then, an operation returns to Step S22 and processing is again repeated from the buffer completion wait. The processing via such Steps S25 and S26 is repeated until jumps of all the sectors (all the sectors between the sector 51 and the sector 52 in FIG. 4) set in the overwrite inhibiting area are completed.

On the other hand, if it is determined that the sector is not a sector of the overwrite inhibiting area in Step S25, decoding of the sector is performed (Step S27) and next, it is checked whether an address of the sector is an ending address of a reproduction track or not (Step S28). Then, if not (it is determined to satisfy No in Step S28), it is checked whether reproducing direction of the overwrite inhibiting area (direction of a special reproducing mode) is next issued or not (Step S29) and if not, an operation returns to Step S22 and processing is repeated from the buffer completion wait.

During performing the decoding while repeating the processing of such Steps S2 to S29, when the special reproducing key 32 is operated, the determination in Step S29 is Yes, so that the special reproducing mode is executed at this time.

That is, when the special reproducing mode is directed, the MPU 20 stores a decoding position (a position of the sector 54 in FIG. 4E) at that point in time as the present position (Step S30), and then sets a starting position of the decoding to the sector 51 of the beginning of the overwrite inhibiting area from the sector 54 (Step S31), and it is determined whether the sector 51 is reproducible (Step S32). Then, if so, after performing the decoding of the sector (Step S33), it is determined whether there is the next sector of the overwrite inhibiting area or not (Step S34) and if so, an operation returns to Step S31 and the next sector is set to a starting position of decoding. In the special reproducing mode, the decoding of the overwrite inhibiting area is performed by repeating the processing of such Steps S31 to S34 to the final sector 52 of the overwrite inhibiting area.

Subsequently, when the decoding of the overwrite inhibiting area is completed (it is determined to satisfy No in Step S34), jumping is performed to the next sector 55 of the sector 54 stored as the present position (Step S35), and an operation returns to Step S22 and decoding by the normal reproducing mode is again continued.

Incidentally, in the embodiment, the case of applying the disk apparatus of the invention to the MD player is described, but the disk apparatus may be applied to an apparatus having a mechanism for performing the decoding while buffering a digital signal reproduced from a disk in a storage medium (for example, CD player or DVD player).

According to a disk apparatus of the invention, since it is constructed so that reproducing control means sets a predetermined area in a buffer area of a storage medium to an overwrite inhibiting area when overwrite inhibiting is directed by operating directive means and executes a normal reproducing mode while jumping this overwrite inhibiting area, the overwrite inhibiting area can be secured in the buffer area of the storage medium used for the buffering in reproducing a digital signal, and data stored in this overwrite inhibiting area can be easily reproduced anytime.

Also, according to a disk apparatus of the invention, since it is constructed so that when the overwrite inhibiting is directed by operating the directive means, the reproducing control means sets an area between the next section of a buffer section in which buffering is completed at that point in time and a predetermined section to an overwrite inhibiting area, a user operates the directive means only once and thereby, the beginning and end of the overwrite inhibiting area are automatically determined, so that a simple operation can be provided for the user.

Further, according to a disk apparatus of the invention, since it is constructed so that the reproducing control means reproduces the overwrite inhibiting area once or repeatedly reproduces the area two or more times when a special reproducing mode is directed by operating directive means, the data of the overwrite inhibiting area can be instantly reproduced by a simple operation of only operating the directive means.

Furthermore, according to a disk apparatus of the invention, since it is constructed so that the reproducing control means executes the normal reproducing mode again from the buffer section of the time before executing the special reproducing mode when the special reproducing mode is executed and the overwrite inhibiting area is reproduced once or repeatedly reproduced two or more times, switching between the normal reproducing mode and the special reproducing mode can be done smoothly.

Moreover, according to a disk apparatus of the invention, since it is constructed so that the overwrite inhibiting area can be set to plural portions in the buffer area of the storage medium, access to the beginning of phrases of the plural portions can be easily obtained without waiting time.

In addition, since a disk apparatus of the invention is applied to an MD player, for example, when contents of foreign languages conversation are reproduced, a repeat of one sentence can be done, and a repeat of one bar can be done in reproduction of music.

What is claimed is:

1. A disk apparatus comprising:

reproducing control means for reproducing a digital signal while continuously repeating processing for sequentially buffering the digital signal read from a disk in a storage medium and also sequentially decoding the buffered area at proper timing in a normal reproducing mode, and directive means for directing overwrite inhibiting of said storage medium, wherein
said reproducing control means sets a predetermined area in a buffer area of said storage medium to an overwrite inhibiting area when the overwrite inhibiting is directed by operating said directive means and executes the normal reproducing mode while jumping the overwrite inhibiting area.

2. The disk apparatus as defined in claim 1, wherein
when the overwrite inhibiting is directed by operating said directive means, said reproducing control means sets an area between the next section of a buffer section in which buffering is completed at that point in time and a predetermined section to an overwrite inhibiting area.

3. The disk apparatus as defined in claim 1 or 2, further comprising:

directive means for directing a special reproducing mode for reproducing the overwrite inhibiting area of said storage medium is included, wherein
said reproducing control means reproduces the overwrite inhibiting area once or repeatedly reproduces the area two or more times when the special reproducing mode is directed by operating said directive means.

4. The disk apparatus as defined in claim 3, wherein
said reproducing control means executes the normal reproducing mode again from the buffer section of the time before executing the special reproducing mode, when the special reproducing mode is executed and the overwrite inhibiting area is reproduced once or repeatedly reproduced two or more times.

5. The disk apparatus as defined in claim 1 wherein
the overwrite inhibiting area can be set to plural portions in the buffer area of said storage medium.

6. The disk apparatus as defined in claim 1, wherein
said disk is a mini disk,
said storage medium is D-RAM, and
a buffer section of said storage medium is a sector unit.

* * * * *